Jan. 17, 1967    G. J. DEELMAN    3,299,340
CIRCUIT ARRANGEMENT FOR OBTAINING
A STABILIZED SUPPLY VOLTAGE
Filed Aug. 28, 1963

INVENTOR.
GERARDUS J. DEELMAN
BY
Frank R. Trifari
AGENT

United States Patent Office 3,299,340
Patented Jan. 17, 1967

3,299,340
CIRCUIT ARRANGEMENT FOR OBTAINING A STABILIZED SUPPLY VOLTAGE
Gerardus Jacobus Deelman, Emmasingel, Eindhoven, Netherlands, assignor to North American Philips Company, Inc., New York, N.Y., a corporation of Delaware
Filed Aug. 28, 1963, Ser. No. 305,054
Claims priority, application Netherlands, Sept. 17, 1962, 283,318
12 Claims. (Cl. 321—18)

The invention relates to a circuit arrangement for obtaining a stabilized supply voltage from an alternating voltage source by means of a rectifier controlled with the interposition of a phase-shifting network, the voltage derived from the rectifier being supplied to the load.

Such a circuit arrangement is known. It is an object of the invention to provide a simple and effective circuit arrangement in which both slow and rapid load or supply voltage variations are compensated. In accordance with the invention, a transistor is provided having its collector-emitter path connected between the output electrode of the controlled rectifier and the load and having its base connected to an element of constant voltage. The transistor is thermally coupled to a temperature-dependent impedance element included in the phase shifting network so that when the temperature of the transistor increases, the average voltage between the output electrode of the rectifier and a reference point is decreased. Thermal coupling according to the invention has the advantage that the dissipation in the transistor is restricted to a safe range of values.

It is noted that it is known per se to stabilize a voltage which is subject to rapid fluctuations by supplying such a voltage to a load through the collector emitter path of a transistor, in the base circuit of which a source of constant voltage is provided. However, the known circuit arrangement provides no protection of the transistor against overloading.

Figure 1:
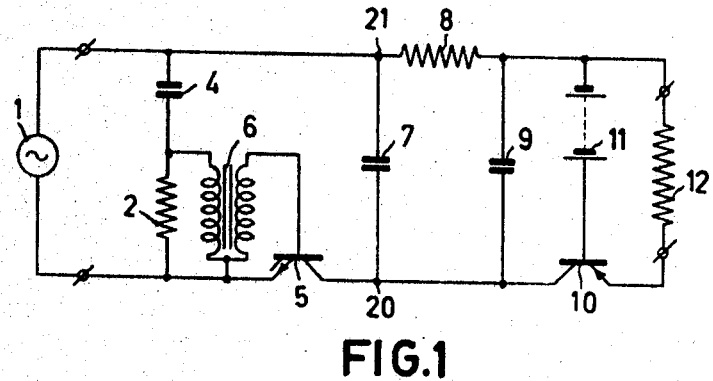
Figure 2:
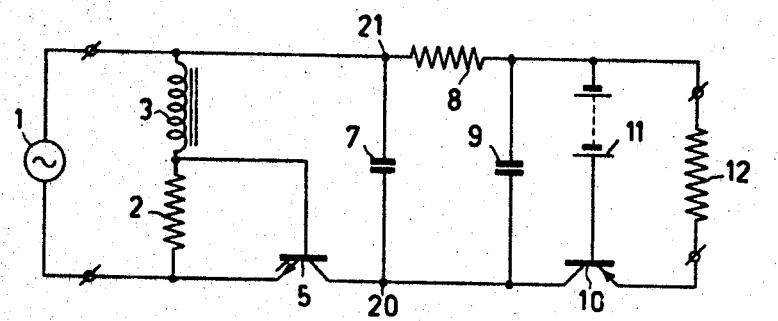
Figure 3:
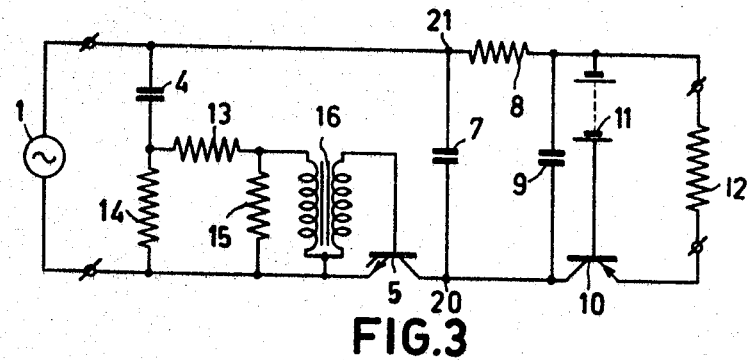

In order that the invention may readily be carried into effect, three embodiments thereof will now be described more fully, by way of example, with reference to the accompanying drawing in which the FIGURES 1, 2 and 3 show different circuit arrangements according to the invention.

In the circuit arrangement shown in FIGURE 1, the voltage from an alternating current source 1 is rectified by means of a controlled rectifier 5 which preferably is of the pnpn-type. The direct voltage produced is smoothed by a filter comprising the capacitors 7 and 9 and the resistor 8, and then supplied to the load 12. The voltage required for controlling the rectifier 5 is obtained by means of a phase-shifting network consisting of the temperature responsive resistor 2 and the capacitor 4. The voltage across the resistor 2 is applied wholly or partially through an inverting transformer 6 between two of the electrodes of the rectifier 5.

Dependent upon the ratio of the impedances 2 and 4, the rectifier 5 is conductive during a larger or smaller part of each cycle of the alternating voltage from the source 1. In this manner the average rectified voltage between the points 20 and 21 is varied.

According to the invention, a transistor 10 is provided having its emitter-collector path connected between the point 20 and the load 12. The base of the transistor is connected to the direct voltage source 11. The transistor 10 is coupled thermally to the resistor 2. It is noted that the element of constant voltage 11 may also be, for example, a Zener-diode through which the current flows in a reverse direction. The resistor 2 preferably is an NTC-resistor, i.e. a resistor having a large negative temperature coefficient.

If the transistor 10 tends to be overloaded, its temperature increases and consequently also that of the NTC-resistor 2. As a result, the resistance value of the NTC-resistor 2 decreases whereupon the voltage across the resistor 2 varies in value and phase. In turn, the value and phase of the voltage which is applied between the input electrode and control electrode of the rectifier 5 through the inverting transformer 6 is varied. In particular this voltage decreases in value. The rectifier 5 is now conductive for a smaller part of each cycle of the alternating current source. As a result of this the average voltage across the capacitor 7 decreases and thereby the dissipation of the transistor 10.

Slow variations in the load 12 or in the supply voltage 1 are consequently compensated by the thermal coupling of the transistor 10 and the NTC-resistor 2. The NTC-resistor 2 is preferably constructed as a disc and adhered to the transistor 10 by means of an electrically insulating cement of high thermal conductivity.

In one embodiment of the invention, the controlled rectifier 5 was of the type BTY 27 and the transistor 10 of the type ASZ 16. The resistor 8 was 10 ohms. The capacitors 4, 7 and 9 were 0.1 $\mu$f., 100 $\mu$f. and 400 $\mu$f., respectively. The voltage of the source 11 was 200 volts. The NTC-resistor 2 was of the type VA 1006. The load resistor 12 was 300 ohms.

If the voltage of the alternating voltage source slowly varied from 200 to 250 volts, it appeared that the load current through 12 varied by only 2%. The temperature of the transistor 10 remained constant at 80° C. within 5°.

The phase shifting network may be constructed in many ways. For example, in the circuit arrangement shown in FIGURE 2, the capacitor 4 of FIGURE 1 is replaced by a choke coil 3. The phase of the voltage across the NTC-resistor 2 with respect to the phase of the voltage of the alternating voltage source 1 provides the necessary control so that the inverting transformer 6 may be omitted.

It is also possible to couple the transistor 10 to a resistor in the phase shifting network having a large positive temperature coefficient, i.e. to a PTC-resistor. In FIGURE 3, a variation of the circuit arrangement shown in FIGURE 1 is shown in which a PTC resistor 13 is used instead of the NTC-resistor. The resistors 14 and 15 may be normal resistors. If the temperature of the transistor 10 increases, the resistance value of the PTC-resistor 13 increases and thereby the voltage across this resistor increases. The voltage across the resistor 15 decreases as a result and consequently also the control voltage supplied to the controlled rectifier 5. As a result, the rectifier 5 is conductive for a smaller part of each cycle so that the average voltage across the capacitor 7 and thereby the dissipation of the transistor 10 decrease.

A temperature-dependent capacitor may be used as the temperature dependent impedance element.

Instead of using a controlled rectifier of the pnpn-type, a controlled gas tube (thyratron) may also be used, if desired.

What is claimed is:

1. A circuit for regulating the voltage across a load comprising, input means connected to a source of alternating current, a controlled rectifier having an input and an output electrode defining a current path therein and a control electrode for controlling the current flow in said path, means connecting said controlled rectifier to said input means so as to produce a direct current voltage at said output electrode for application to said load, phase shift means electrically connected between said input means and said control electrode, a transistor comprising first and second electrodes defining a current path therein and a control electrode for controlling the current flow in said path, means connecting said transistor current path in series with said load and said controlled rectifier output electrode, a constant voltage device, means connecting said transistor control electrode to said constant voltage device, and a temperature responsive impedance element thermally coupled to said transistor and electrically connected in said phase shift means so as to vary the conduction period of said controlled rectifier in response to the temperature variations of the transistor thereby to vary the average value of the direct current voltage produced by said controlled rectifier.

2. A circuit as described in claim 1, wherein said temperature responsive impedance element is connected in said phase shift means so as to vary said conduction period in a manner such that the average value of the direct current voltage produced varies inversely with the temperature variation of the transistor.

3. A circuit as described in claim 2, wherein said temperature responsive element comprises a resistor having a negative temperature coefficient characteristic.

4. A circuit as described in claim 3, wherein said negative temperature coefficient resistor is constructed in the form of a disc, and means for affixing said disc to said transistor comprising an electrically insulating cement having a high thermal conductivity.

5. A circuit as described in claim 2, wherein said temperature responsive element comprises a resistor having a positive temperature coefficient characteristic.

6. A circuit for regulating the voltage across a load comprising, a source of alternating current, controlled rectifier means having first and second electrodes defining a current path therein and a control electrode for controlling the current flow in said path, a semiconductor device comprising first and second electrodes defining a current path therein and a control electrode for controlling the current flow in said path, means connecting said controlled rectifier to said current source so as to produce a direct current voltage at a pair of terminals of said circuit, means connecting said load and the current path of said semiconductor device in series across said terminals, means providing a constant voltage connected to said semiconductor device control electrode, a phase shift circuit interconnecting said current source and said controlled rectifier control electrode, said phase shift circuit including a temperature responsive impedance element thermally coupled to said semiconductor device and responsive to the temperature variations therein so as to vary the relative phase of the voltage applied to said controlled rectifier control electrode in a sense to vary the average voltage of the direct current voltage produced by said controlled rectifier inversely with the temperature variations of the semiconductor device.

7. A circuit as described in claim 6, wherein said phase shift circuit comprises a capacitor and a negative temperature coefficient resistor connected in series circuit across said current source, and means connecting said controlled rectifier control electrode to an intermediate junction point of said series circuit.

8. A circuit as described in claim 6, wherein said phase shift circuit comprises an inductance and a negative temperature coefficient resistor connected in series circuit across said current source, and means connecting said controlled rectifier control electrode to an intermediate junction point of said series circuit.

9. A circuit as described in claim 6, wherein said phase shift circuit comprises a capacitor and a first resistor serially connected across said current source, a positive temperature coefficient resistor and a second resistor connected in series across said first resistor, and means electrically connecting said controlled rectifier control electrode to an intermediate point in the series circuit comprising said positive temperature coefficient resistor and said second resistor.

10. A circuit for regulating the voltage across a load comprising, input means connected to a source of alternating current, a controlled rectifier having first and second electrodes defining a current path therein and a control electrode for controlling the current flow in said path, a semiconductor device comprising first and second electrodes defining a current path therein and a control electrode for controlling the current flow in said path, means connecting said controlled rectifier current path, said semiconductor device current path and said load in series across said input means, means providing a constant voltage connected to said semiconductor device control electrode, a phase shift circuit interconnecting said input means and said controlled rectifier control electrode, said phase shift circuit including a temperature responsive impedance element thermally coupled to said semiconductor device and responsive to the temperature variations therein so as to vary the relative phase of the voltage applied to said controlled rectifier control electrode thereby to vary the conduction period of said controlled rectifier in a sense to maintain the load voltage constant.

11. A circuit as described in claim 10, further comprising alternating current filtering means interconnecting one of said controlled rectifier first and second electrodes with said load.

12. A circuit for regulating the voltage across a load comprising, a source of alternating current, controlled rectifier means having first and second electrodes defining a current path therein and a control electrode for controlling the current flow in said path, means connecting said rectifier current path in series with said current source so as to produce a direct current voltage at a pair of terminals of said circuit, a semiconductor device comprising first and second electrodes defining a current path therein and a control electrode for controlling the current flow in said path, means connecting said load and the current path of said semiconductor device in series across said terminals, means providing a constant voltage connected to said semiconductor device control electrode, a phase shift circuit interconnecting said current source and said controlled rectifier control electrode, said phase shift circuit including a temperature responsive impedance element thermally coupled to said semiconductor device and responsive to the temperature variations therein so as to vary the relative phase of the voltage applied to said controlled rectifier control electrode thereby to vary the conduction period of said controlled rectifier means in a sense to vary the average D.C. voltage produced at said terminals inversely with the temperature variations of the semiconductor device.

No references cited.

JOHN F. COUCH, *Primary Examiner.*

W. M. SHOOP, *Assistant Examiner.*